(12) United States Patent
Barlettano

(10) Patent No.: US 11,629,869 B1
(45) Date of Patent: Apr. 18, 2023

(54) PERSONAL AIR COOLER

(71) Applicant: Ontel Products Corporation, Fairfield, NJ (US)

(72) Inventor: Scott Barlettano, Wayne, NJ (US)

(73) Assignee: Ontel Products Corporation, Fairfield, NJ (US)

( * ) Notice: Subject to any disclaimer, the term of this patent is extended or adjusted under 35 U.S.C. 154(b) by 0 days.

(21) Appl. No.: 17/714,727

(22) Filed: Apr. 6, 2022

Related U.S. Application Data (63) Continuation of application No. 29/830,987, filed on Mar. 16, 2022, and a continuation of application No. 29/830,986, filed on Mar. 16, 2022.

(51) Int. Cl.
*F24F 6/16* (2006.01)
*F24F 7/007* (2006.01)
*B01F 23/213* (2022.01)
*F24F 13/20* (2006.01)

(52) U.S. Cl.
CPC .......... *F24F 6/16* (2013.01); *B01F 23/21312* (2022.01); *F24F 7/007* (2013.01); *F24F 13/20* (2013.01); *F24F 2221/12* (2013.01); *F24F 2221/38* (2013.01)

(58) Field of Classification Search
CPC .... F24F 6/16; F24F 7/007; F24F 13/20; F24F 2221/12; F24F 2221/38; B01F 23/21312
See application file for complete search history.

(56) References Cited

U.S. PATENT DOCUMENTS

| 2,076,192 | A | | 4/1937 | Carr |
| 2,079,117 | A | | 5/1937 | Hays |
| 3,004,403 | A | | 10/1961 | Laporte |
| 3,045,450 | A | * | 7/1962 | Chandler ................. F24F 6/04 261/24 |
| 4,221,331 | A | | 9/1980 | Goran, Jr. |
| D270,088 | S | | 8/1983 | Hepfler |
| D314,617 | S | | 2/1991 | Yuen |
| D318,526 | S | | 7/1991 | Chaney |
| D339,858 | S | | 9/1993 | Shong |
| D349,954 | S | | 8/1994 | Steiner et al. |
| 5,338,495 | A | | 8/1994 | Steiner et al. |
| D351,901 | S | | 10/1994 | Boruch et al. |
| 5,620,633 | A | | 4/1997 | Junkel et al. |
| 5,667,731 | A | | 9/1997 | Junkel et al. |
| 5,667,732 | A | * | 9/1997 | Lederer ............ B01F 23/21311 261/78.2 |

(Continued)

FOREIGN PATENT DOCUMENTS

CN 305803742 5/2020

*Primary Examiner* — Emmanuel E Duke
(74) *Attorney, Agent, or Firm* — Dickinson Wright PLLC (57) ABSTRACT

An air cooler includes a body having a top portion, a bottom portion, and a middle portion situated between the top and bottom portions. The air cooler further includes a fan disposed in the top portion of the body. The fan includes a fan hub and a plurality of fan blades centrally attached to the fan hub. The air cooler also includes a first mister disposed at a first location within the body. The first location is in front of the plurality of fan blades in the top portion of the body. The air cooler further includes a second mister disposed at a second location within the body. The second location is in front of the plurality of fan blades in the top portion of the body and different from the first location.

20 Claims, 8 Drawing Sheets

(56) References Cited

U.S. PATENT DOCUMENTS

| | | |
|---|---|---|
| D387,422 S | 12/1997 | Radtke et al. |
| D394,500 S | 5/1998 | Feer |
| 5,752,662 A | 5/1998 | Hsu |
| 5,843,344 A | 12/1998 | Junkel et al. |
| 6,378,845 B1 * | 4/2002 | Hsu .................... F24F 6/00 239/289 |
| 6,398,132 B1 | 6/2002 | Junkel et al. |
| 6,543,247 B2 | 4/2003 | Strauss |
| 6,827,290 B2 | 12/2004 | Zimmerman |
| D529,166 S | 9/2006 | Geringer |
| 7,143,597 B2 | 12/2006 | Hyland et al. |
| D543,614 S | 5/2007 | Chen |
| D544,078 S | 6/2007 | Geringer |
| D564,084 S | 3/2008 | Chen |
| 7,997,565 B1 * | 8/2011 | Chan ................... F24F 6/043 261/99 |
| 8,016,270 B2 | 9/2011 | Chen et al. |
| 8,123,290 B1 | 2/2012 | Aiken et al. |
| 8,893,984 B2 | 11/2014 | Sands et al. |
| D762,743 S | 8/2016 | Fan |
| 9,964,317 B2 * | 5/2018 | Chang .................. F24F 1/022 |
| 10,006,651 B1 * | 6/2018 | Myers .................. F24F 6/16 |
| D837,963 S | 1/2019 | Xu |
| 10,272,455 B2 * | 4/2019 | Zhang ................ B05B 7/0081 |
| 10,330,333 B2 * | 6/2019 | Kaleta .................. F24F 7/007 |
| D874,623 S | 2/2020 | Lupi |
| D879,283 S | 3/2020 | Liao |
| 2002/0148909 A1 | 10/2002 | Junkel et al. |
| 2003/0150518 A1 * | 8/2003 | Slade .................. B67D 3/0048 141/309 |
| 2008/0169575 A1 * | 7/2008 | Chen .................. F24F 5/0035 261/78.2 |
| 2008/0237900 A1 | 10/2008 | Junkel et al. |
| 2008/0244954 A1 | 10/2008 | Shannon |
| 2012/0319308 A1 | 12/2012 | Chen et al. |
| 2013/0168882 A1 * | 7/2013 | Lykins ................. F24F 6/14 220/592.2 |
| 2018/0307284 A1 * | 10/2018 | Saravis ................ G06F 1/206 |
| 2019/0022677 A1 * | 1/2019 | Zhang .................. B05B 17/06 |
| 2020/0088424 A1 | 3/2020 | Ratterree et al. |
| 2020/0309152 A1 | 10/2020 | Sanford |

* cited by examiner

PERSONAL AIR COOLER

CROSS-REFERENCE TO RELATED APPLICATIONS

This application is a continuation of U.S. Design application Ser. No. 29/830,987, filed Mar. 16, 2022. This application is also a continuation of U.S. Design application Ser. No. 29/830,986, filed Mar. 16, 2022, the entire disclosures of which are hereby incorporated by reference for all purposes.

TECHNICAL FIELD

The present disclosure relates to air coolers and more specifically, a personal air cooler.

BACKGROUND

Air coolers are used to provide a cooling current of air to a user to combat heat and/or dehydration. Such air coolers may work alone, or may be in combination with a liquid sprayer which further supplies a mist of fluid (e.g. water) to the user for an enhanced cooling experience. To generate the mist of fluid, the liquid sprayer normally uses an atomizer or a pump means for pumping liquid to a misting nozzle. One of the drawbacks of using such an atomizer or pump means is that it complicates the structural design of the air cooler. This not only increases the manufacturing cost of the air cooler, but also causes inconvenience for a user to use the air cooler due to its added weight. Therefore, there is a need for an air cooler that can generate mist in a more gentle and cost-effective way.

SUMMARY

This section provides a general summary of the present disclosure and is not a comprehensive disclosure of its full scope or all of its features, aspects, and objectives.

Disclosed herein are implementations of an air cooler. In one embodiment, an air cooler is disclosed. The air cooler may include a body having a top portion, a bottom portion, and a middle portion situated between the top and bottom portions. The air cooler may further include a fan disposed in the top portion of the body. The fan may include a fan hub and a plurality of fan blades centrally attached to the fan hub. The air cooler may also include a first mister disposed at a first location within the body. The first location may be in front of the plurality of fan blades in the top portion of the body. The air cooler may further include a second mister disposed at a second location within the body. The second location may be in front of the plurality of fan blades in the top portion of the body and different from the first location.

In another embodiment, an air cooler is disclosed. The air cooler may include a body having a top portion, a bottom portion, and a middle portion situated between the top and bottom portions. The air cooler may further include a fan disposed in the top portion of the body. The fan may include a fan hub and a plurality of fan blades centrally attached to the fan hub. The air cooler may also include a first mister disposed at a first location within the body. The first location may be in front of the plurality of fan blades in the top portion of the body. The air cooler may further include a second mister disposed at a second location within the body. The second location may be in front of the plurality of fan blades in the top portion of the body. The second location may be different from the first location. The air cooler may also include a first wicking cylinder at least partially coupled to the first mister and configured to supply liquid to the first mister for dispensing mist. The air cooler may further include a second wicking cylinder at least partially coupled to the second mister and configured to supply liquid to the second mister for dispending mist.

In yet another embodiment, an air cooler is disclosed. The air cooler may include a body having a top portion, a bottom portion, and a middle portion situated between the top and bottom portions. The air cooler may further include a fan disposed in the top portion of the body. The fan may include a fan hub and a plurality of fan blades centrally attached to the fan hub. The air cooler may also include a fan shroud circumferentially surrounding the fan and configured to funnel an air flow from the fan when the air cooler is in operation. The air cooler may further include a first mister disposed at a first location within the body. The first location may be at a first bottom portion of the fan shroud and in front of the plurality of fan blades in the top portion of the body. The first mister may be positioned at a first angle directing to the fan. The air cooler may further include a second mister disposed at a second location within the body. The second location may be at a second bottom portion of the fan shroud and in front of the plurality of fan blades in the top portion of the body. The second location may be different from the first location. The second mister may be positioned at a second angle directing to the fan.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
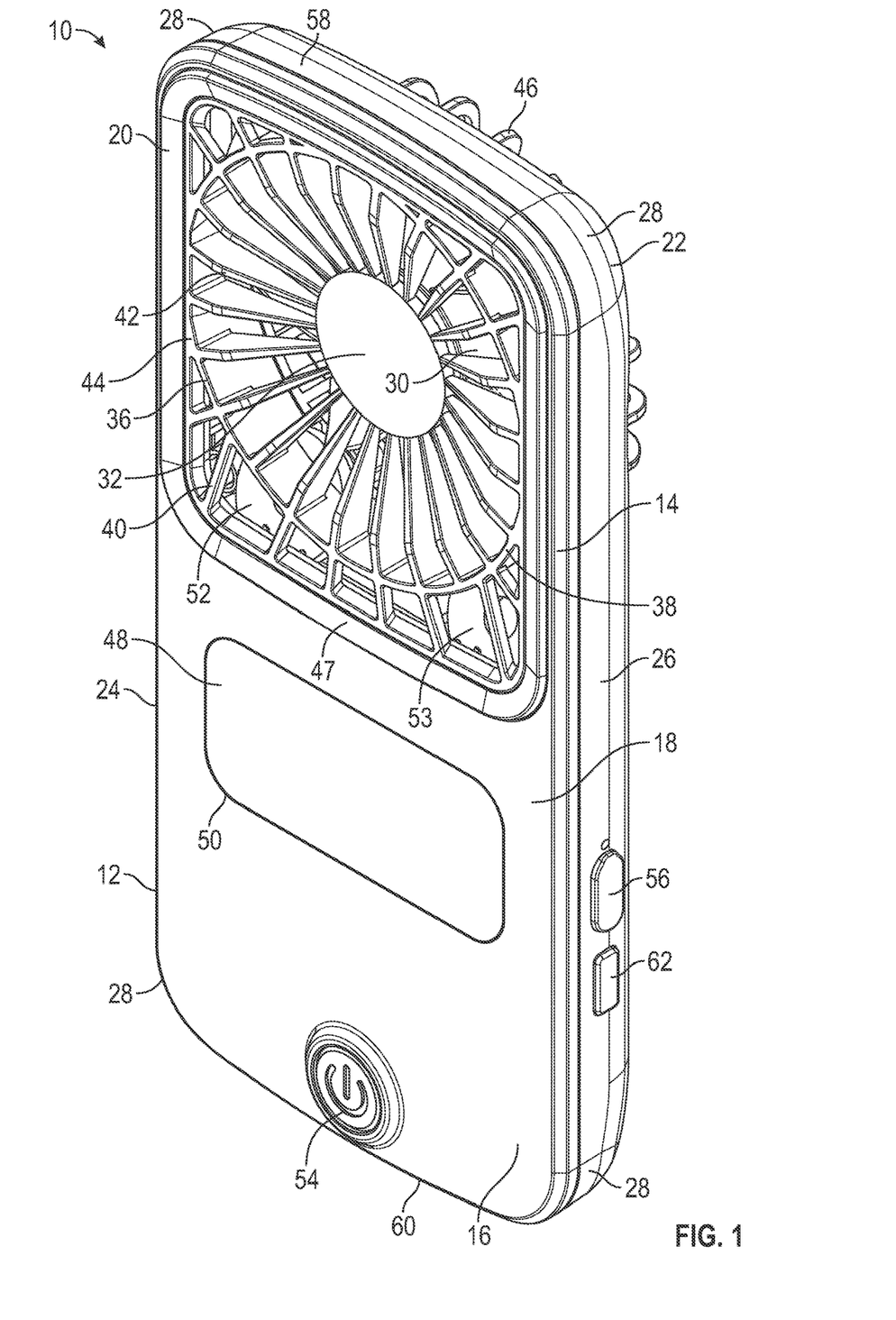
FIG. 1 depicts a perspective front view of an air cooler according to one or more embodiments of the present disclosure.
Figure 2:
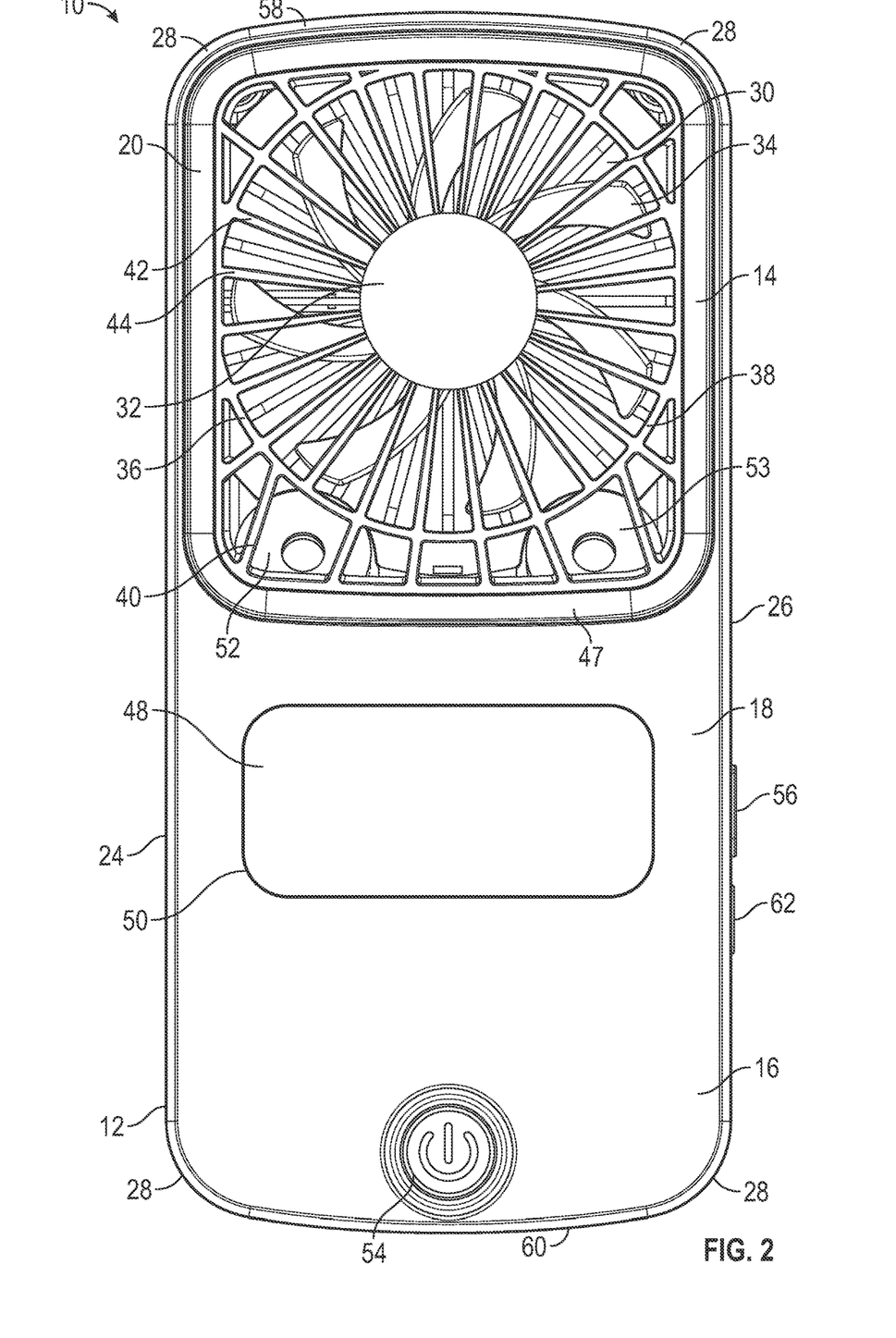
FIG. 2 depicts a front view of the air cooler of FIG. 1.

Aspects of the present disclosure relate to air coolers and more specifically, a personal air cooler. FIG. 1 depicts a perspective front view of an air cooler according to one or more embodiments of the present disclosure. FIG. 2 depicts a front view of the air cooler of FIG. 1. The air cooler 10 may be a personal air cooler, which may be carried by a user in a user's pocket, a user's hand, or the like. Referring to FIGS. 1 and 2, the air cooler 10 may include a body 12 having a top portion 14, a bottom portion 16, and a middle portion 18 situated between the top and bottom portions 14 and 16. The body 12 may include a front face 20, a rear face 22 opposing to the front face 20, a left face 24, and a right face 26 opposing to the left face 24. The body 12 may be generally rectangular in shape or any other desired shapes. The body 12 may include rounded edges 28 at corner portions thereof.

The air cooler 10 may include a fan 30 disposed within the body 12 thereof. In some embodiments, the fan 30 may be disposed in the top portion 14 of the body 12. The fan 30 may include a fan hub 32 and a plurality of fan blades 34 (see FIG. 2) centrally attached to the fan hub 32. The plurality of fan blades 34 may be generally straight or curved in shape or any other desired shapes. The plurality of fan blades 34 may rotate around the fan hub 32 when the air cooler 10 is in operation.

The air cooler 10 may further include a fan shroud 36 circumferentially surrounding the fan 30 (i.e. the fan hub 32 and the plurality of fan blades 34 of the fan 30). The fan shroud 36 may be a plastic ring circumferentially surrounding the fan 30 so as to funnel an air flow from the fan 30 when the air cooler 10 is in operation. The fan shroud 36 may include a front edge 38 and a rear edge 80 (see FIG. 6). The front edge 38 may connect to a fan grill of the fan 30.

The air cooler 10 may include a motor electronically coupled to the fan 30 and configured to control the operation of the fan 30. For example, the motor may control the fan 30 to operate at different fan speeds. In some embodiments, the motor may be positioned within the fan hub 32. In some other embodiments, the motor may be positioned in the middle 18 or bottom portion 16 of the air cooler 10.

The air cooler 10 may further include a first fan grill 40 (or a first fan guard) covering the fan 30 and the fan shroud 36 from the front face 20 of the body 12 thereof. The first fan grill 40 may include a plurality of bars 42 extending generally from the fan hub 32 to edges 44 thereof, where two adjacent bars define a space there between. The first fan grill 40 may be configured to allow air and mist to flow through the space. The first fan grill 40 may connect to the front edge 38 of the fan shroud 36.

The air cooler 10 may also include a second fan grill 46 (or a second fan guard) covering the fan 30 and the fan shroud 36 from the rear face 22 of the body 12 thereof. The air cooler 10 may further include a frame 47 removably attached to the front face 20 of the body 12 thereof and configured to secure the first fan grill 40 to the body 12 thereof. In some embodiments, the frame 47 may be pressed onto the body 12.

The air cooler 10 may include an opening 48 defined in the body 12 thereof. In some embodiments, the opening 48 may be defined in the middle portion 18 of the body 12. The opening 48 may receive a tank 49 (see FIG. 3 or 4) therein. The tank 49 may be configured to store a liquid (e.g. water) therein.

The air cooler 10 may further include a first cover 50 (e.g. a front cover) covering the opening 48 from the front face 20 of the body 12 thereof. The first cover 50 may be made from of a translucent or clear material, such as a translucent or clear plastic or any other desired materials. Using the translucent or clear material for the first cover 50 may facilitate the user to determine the amount of liquid in the tank 49 received in the opening 48, and further to decide when the tank 49 needs to be refilled. A gasket (not shown) may be circumferentially attached around the first cover 50 or around the opening 48 to keep the opening 48 sealed (i.e. watertight) when the first cover 50 covers the opening 48. The first cover 50 may not be removed.

Referring to FIGS. 1 and 2, the air cooler 10 may include a first mister 52 disposed at a first location within the body 12 thereof. The air cooler 10 may further include a second mister 53 disposed at a second location within the body 12 thereof, and the second location is different from the first location. The first and second locations may be symmetrical within the body 12 of the air cooler 12, or in any other desired configurations. In some embodiments, the first and second locations may be in front of the plurality of fan blades 34 in the top portion 14 of the body 12. In some other embodiments, the first and second locations may be at bottom portions (e.g. a first bottom portion and a second bottom portion) of the fan shroud 36 and in front of the plurality of fan blades 34 in the top portion 14 of the body 12. Each of the first and second misters 52 and 53 may dispense (or spray) mist into an air flow from the fan 30 when the air cooler 10 is in operation. As such, the air flow from the fan 30 may be mixed with the mist dispensed from the first and second misters 52 and 53 so as to provide an additional cooling effect to the user. Although FIGS. 1 and 2 depict that the air cooler 10 includes two misters disposed within the body 12, it is contemplated that more than two misters may be disposed within the body 12 to dispense mist to the user when the air cooler 10 is in operation.

The first mister 52 may be positioned at a first angle directing to the fan 30. The second mister 53 may be positioned at a second angle directing to the fan 30. The first and second angles may be the same or different. The angled first and second misters 52 and 53 may allow the mist dispensed therefrom to be sufficiently mixed with the air flow from the fan 30 when the air cooler 10 is in operation.

In order for the first and second misters 52 and 53 to dispense mist, the air cooler 10 may include a first wicking cylinder 64 (see FIG. 3 or 4) at least partially coupled to the first mister 52 and configured to supply liquid to the first mister 52 for dispensing the mist. The air cooler 10 may further include a second wicking cylinder 72 (also see FIG. 3 or 4) at least partially coupled to the second mister 53 and configured to supply liquid to the second mister 53 for dispensing the mist. The first wicking cylinder 64 may include a top end portion, a bottom end portion, and a middle portion extending between the top and bottom end portions thereof. The bottom end portion of the first wicking cylinder 64 may be positioned within the tank 49 received in the opening 48 defined in the body 12. The first wicking cylinder 64 may be configured to absorb liquid in the tank 49, if there is any, at the bottom end portion thereof and to draw up the liquid to the top end portion thereof. The middle portion of the first wicking cylinder 64 may be at least partially positioned within the tank 49. The top end portion of the first wicking cylinder 64 may be positioned outside the tank 49 and attached to the first mister 52. As such, when the tank 49 is filled with liquid (e.g. water), the first wicking cylinder 64 may absorb the liquid at the bottom end portion thereof and draw up the liquid to the top end portion thereof so as to supply the liquid to the first mister 52. The first mister 52 may then dispense mist using the liquid. The first mister 52 may stop dispensing the mist when there is insufficient liquid in the tank 49, at which point the user may add more liquid into the tank 49 as needed.

Figure 3:
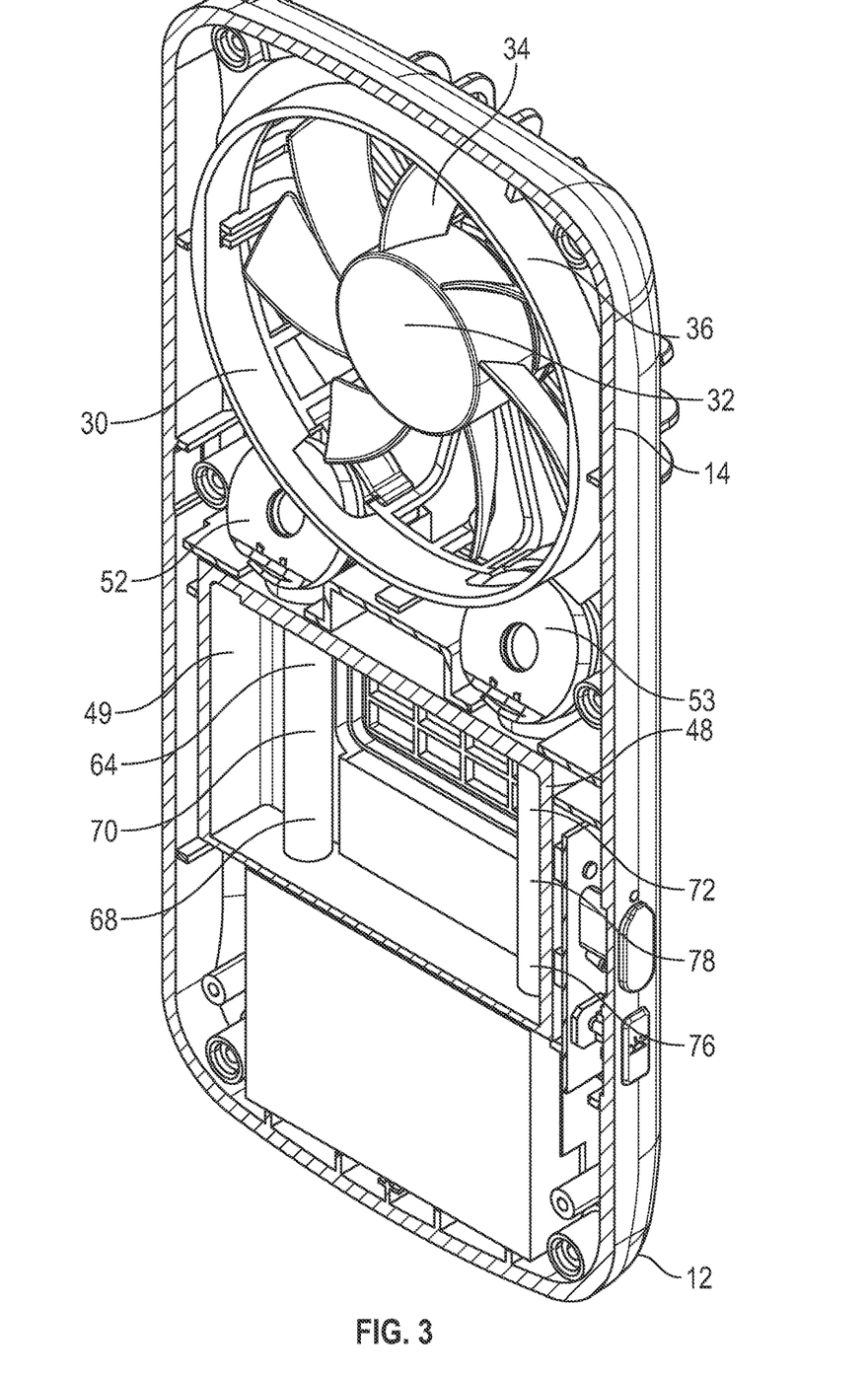
FIG. 3 depicts a perspective front sectional view of the air cooler of FIG. 1 without the front face of the body of the air cooler of FIG. 1.
Figure 4:
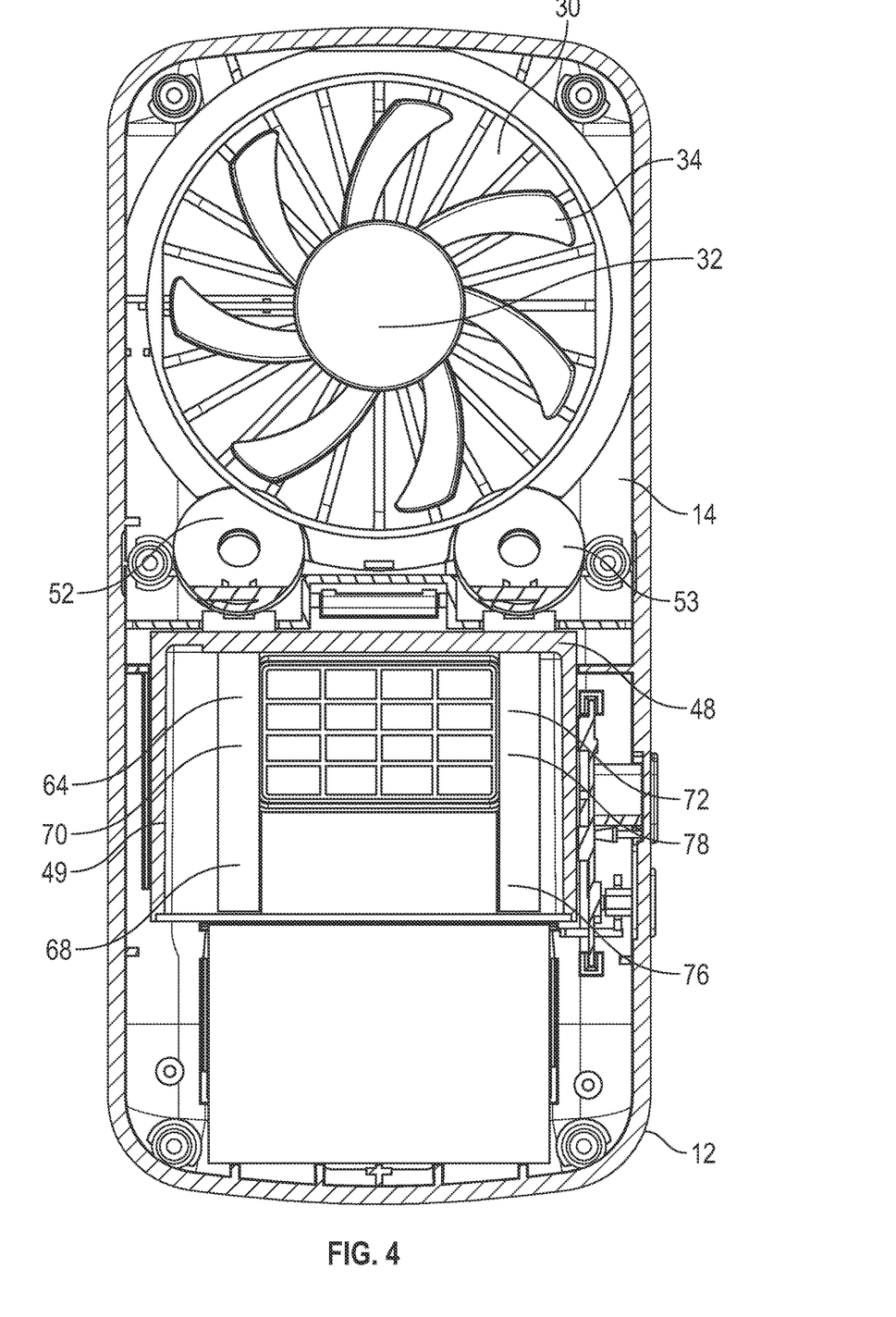
FIG. 4 depicts a front sectional view of the air cooler of FIG. 1 without the front face of the body of the air cooler of FIG. 1.

Similarly, the second wicking cylinder 72 may include a top end portion, a bottom end portion, and a middle portion extending between the top and bottom end portions thereof. The bottom end portion of the second wicking cylinder 72 may be positioned within the tank 49. The second wicking cylinder 72 may be configured to absorb liquid in the tank 49, if there is any, at the bottom end portion thereof and to draw up the liquid to the top end portion thereof. The middle portion of the second wicking cylinder 72 may be at least partially positioned within the tank 49. The top end portion of the second wicking cylinder 72 may be positioned outside the tank 49 and attached to the second mister 53. As such, when the tank 49 is filled with liquid (e.g. water), the second wicking cylinder 72 may absorb the liquid at the bottom end portion thereof and draw up the liquid to the top end portion thereof so as to supply the liquid to the second mister 53. The second mister 53 may then dispense mist using the liquid. The second mister 53 may stop dispensing the mist when there is insufficient liquid in the tank 49, at which point the user may add more liquid into the tank 49 as needed.

The air cooler 10 may further include a tray (not shown) disposed beneath the first and second misters 52 and 53 and configured to capture any condensation or liquid that drips from the first and second misters 52 and 53. In some embodiments, a single tray may be used to capture the condensation or liquid that drips from the first and second misters 52 and 53. In some other embodiments, each of the first and second misters 52 and 53 may be physically coupled with an individual tray disposed there beneath to capture the condensation or liquid that drips there from.

As shown in FIGS. 1 and 2, the air cooler 10 may include a power button 54 disposed on the body 12 thereof. In some embodiments, the power button 54 may be disposed in the bottom portion 16 of the body 12. The power button 54 may be configured to activate (e.g. power ON) or deactivate (e.g. power OFF) the air cooler 10. The power button 54 may also be configured to change the fan speed of the fan 30. For example, when the power button 54 is activated at a first time, the fan 30 may be turned ON (e.g., to a high speed). If the tank 49 has liquid (e.g. water) therein, the first and second misters 52 and 53 may dispense mist into the air flow from the fan 30. When the power button 54 is activated at a second time, the fan speed may decrease, for example, to a medium speed. When the power button 54 is activated at a third time, the fan speed may decrease, for example, to a low speed. When the power button 54 is activated at a fourth time, the fan 30 may be turned OFF. Therefore, by actuating the power button 54, the user may adjust a fan speed of the fan 30 as needed, and the mist dispensed from the first and second misters 52 and 53 may be mixed with the air flow from the fan 30 so as to provide an additional cooling effect to the user.

The air cooler 10 may include a circuit board disposed within the body 12 thereof. The circuit board may be positioned in the middle 18 or bottom portion 16 of the body 12. The circuit board may be electronically connected to the power button 54 and the motor electronically coupled to the fan 30 so as to control the operation of the fan 30 upon an actuation of the power button 54 by the user.

The air cooler 10 may further include a charging port 56 disposed on the body 12 thereof. The charging port 56 may be a USB charging port. In some embodiments, the charging port 56 may be a USB-C charging port which may receive a USB-C charging adapter for charging the air cooler 10. Although FIGS. 1 and 2 depict that the charging port 56 is disposed on the right face 26 of the body 12, it is contemplated that the charging port 56 may be disposed at other desired locations on the body 12, such as the left face 24, a top face 58, or a bottom face 60 of the body 12.

The air cooler 10 may also include a light controller 62 disposed on the body 12 thereof and configured to control the operation of a light source (not shown) positioned on or in the body 12 thereof. The light source may be a light-emitting diode (LED) or any other desired light sources. For example, the light source may be positioned in the opening 48 of the air cooler 10. As such, upon actuation of the light controller 62, the light source may emit light in the opening 48, which may shine through the first cover 50 that covers the opening 48. In some embodiments, the light source may emit light in one of seven colors. The user may press the light controller 62 to change the colors of the light or to set the light source to automatically change the colors of the light through the available colors. In some other embodiments, the light source may emit light in fewer or more colors (i.e. fewer or more than seven colors). Although FIGS. 1 and 2 depict that the light controller 62 is disposed on the right face 26 of the body 12, it is contemplated that the light controller 62 may be disposed at other desired locations on the body 12, such as the left face 24, the top face 58, or the bottom face 60 of the body 12.

FIG. 3 depicts a perspective front sectional view of the air cooler of FIG. 1 without the front face of the body. As shown in FIG. 3, the fan 30 may be disposed in the top portion 14 of the body 12. The fan 30 may include the fan hub 32 and the plurality of fan blades 34 centrally attached to the fan hub 32. The plurality of fan blades 34 may be generally straight or curved in shape or any other desired shapes. The plurality of fan blades 34 may rotate around the fan hub 32 when the air cooler 10 is in operation. The fan shroud 36 may circumferentially surround the fan 30. The fan shroud 36 may be a plastic ring circumferentially surrounding the fan 30 so as to funnel an air flow from the fan 30 when the air cooler 10 is in operation.

As shown in FIG. 3, the first mister 52 may be disposed at a first location within the body 12. The second mister 53 may be disposed at a second location within the body 12, and the second location is different from the first location. The first and second locations may be symmetrical within the body 12 of the air cooler 12, or in any other desired configurations. In some embodiments, the first and second locations may be in front of the plurality of fan blades 34 in the top portion 14 of the body 12. In some other embodiments, the first and second locations may be at bottom portions (e.g. a first bottom portion and a second bottom portion) of the fan shroud 36 and in front of the plurality of fan blades 34 in the top portion 14 of the body 12. Each of the first and second misters 52 and 53 may dispense (or spray) mist into the air flow from the fan 30 when the air cooler 10 is in operation. The first mister 52 may be positioned at a first angle directing to the fan 30. The second mister 53 may be positioned at a second angle directing to the fan 30. The first and second angles may be the same or different. The angled first and second misters 52 and 53 may allow the mist dispensed there from to be sufficiently mixed with the air flow from the fan 30 when the air cooler 10 is in operation.

Referring to FIG. 3, the first wicking cylinder 64 may be at least partially coupled to the first mister 52 and configured to supply liquid to the first mister 52 for dispensing mist. The first wicking cylinder 64 may include a top end portion 66 (see FIG. 5), a bottom end portion 68, and a middle portion 70 extending between the top and bottom end portions 66 and 68 thereof. The bottom end portion 68 of the first wicking cylinder 64 may be positioned within the tank 49 received in the opening 48 defined in the body 12. The first wicking cylinder 64 may be configured to absorb liquid in the tank 49, if there is any, at the bottom end portion 68 thereof and to draw up the liquid to the top end portion 66 of the first wicking cylinder 64. The middle portion 70 of the first wicking cylinder 64 may be at least partially positioned within the tank 49. The top end portion 66 of the first wicking cylinder 64 may be positioned outside the tank 49 and attached to the first mister 52. As such, when the tank 49 is filled with liquid (e.g. water), the first wicking cylinder 64 may absorb the liquid at the bottom end portion 68 thereof and draw up the liquid to the top end portion 66 thereof so as to supply the liquid to the first mister 52. The first mister 52 may then dispense mist using the liquid. The first mister 52 may stop dispensing the mist when there is insufficient liquid in the tank 49, at which point the user may add more liquid into the tank 49 as needed.

As described herein, the second wicking cylinder 72 may be at least partially coupled to the second mister 53 and configured to supply liquid to the second mister 53 for dispensing mist. The second wicking cylinder 72 may include a top end portion 74 (see FIG. 5), a bottom end portion 76, and a middle portion 78 extending between the top and bottom end portions 74 and 76 thereof. The bottom end portion 76 of the second wicking cylinder 72 may be positioned within the tank 49. The second wicking cylinder 72 may be configured to absorb liquid in the tank 49, if there is any, at the bottom end portion 76 thereof and to draw up the liquid to the top end portion 74 of the second wicking cylinder 72. The middle portion 78 of the second wicking cylinder 72 may be at least partially positioned within the tank 49. The top end portion 74 of the second wicking cylinder 72 may be positioned outside the tank 49 and attached to the second mister 53. As such, when the tank 49 is filled with liquid (e.g. water), the second wicking cylinder 72 may absorb the liquid at the bottom end portion 76 thereof and draw up the liquid to the top end portion 74 thereof so as to supply the liquid to the second mister 53. The second mister 53 may then dispense mist using the liquid. The second mister 53 may stop dispensing the mist when there is insufficient liquid in the tank 49, at which point the user may add more liquid into the tank 49 as needed.

FIG. 4 depicts a front sectional view of the air cooler of FIG. 1 without the front face of the body. As shown in FIG. 4, the fan 30 may be disposed in the top portion 14 of the body 12. The fan 30 may include the fan hub 32 and the plurality of fan blades 34 centrally attached to the fan hub 32. The plurality of fan blades 34 may be generally straight or curved in shape or any other desired shapes. The plurality of fan blades 34 may rotate around the fan hub 32 when the air cooler 10 is in operation.

Referring to FIG. 4, the first mister 52 may be disposed at a first location within the body 12. The second mister 53 may be disposed at a second location within the body 12, and the second location is different from the first location. The first and second locations may be symmetrical within the body 12 of the air cooler 12 or in any other desired configurations. In some embodiments, the first and second locations may be in front of the plurality of fan blades 34 in the top portion 14 of the body 12. In some other embodiments, the first and second locations may be at bottom portions (e.g. a first bottom portion and a second bottom portion) of the fan shroud 36 and in front of the plurality of fan blades 34 in the top portion 14 of the body 12. Each of the first and second misters 52 and 53 may dispense (or spray) mist into the air flow from the fan 30 when the air cooler 10 is in operation. The first mister 52 may be positioned at a first angle directing to the fan 30. The second mister 53 may be positioned at a second angle directing to the fan 30. The first and second angles may be the same or different. The angled first and second misters 52 and 53 may allow the mist dispensed there from to be sufficiently mixed with the air flow from the fan 30 when the air cooler 10 is in operation.

As shown in FIG. 4, the first wicking cylinder 64 may be at least partially coupled to the first mister 52 and configured to supply liquid to the first mister 52 for dispensing mist. The second wicking cylinder 72 may be at least partially coupled to the second mister 53 and configured to supply liquid to the second mister 53 for dispensing mist. Each of the first and second wicking cylinder 64 and 72 may include a top end portion (66 or 74, respectively) (see FIG. 3), a bottom end portion (68 or 76, respectively), and a middle portion (70 or 78, respectively) extending between the top and bottom end portions thereof. The bottom end portion (68 or 76, respectively) of each of the first and second wicking cylinder 64 and 72 may be positioned within the tank 49. Each of the first and second wicking cylinder 64 and 72 may be configured to absorb liquid in the tank 49, if there is any, at the bottom end portion (68 or 76, respectively) thereof and to draw up the liquid to the top end portion (66 or 74, respectively) of each of the first and second wicking cylinder 64 and 72. The middle portion (70 or 78, respectively) of each of the first and second wicking cylinder 64 and 72 may be at least partially positioned within the tank 49. The top end portion (66 or 74, respectively) of each of the first and second wicking cylinder 64 and 72 may be positioned outside the tank 49 and attached to each of the first and second misters 52 and 53, respectively. As such, when the tank 49 is filled with liquid (e.g. water), each of the first and second wicking cylinder 64 and 72 may absorb the liquid at the bottom end portion (68 or 76, respectively) thereof and draw up the liquid to the top end portion (66 or 74, respectively) thereof to supply the liquid to each of the first and second misters 52 and 53, respectively. Each of the first and second misters 52 and 53 may then dispense mist using the liquid. Each of the first and second misters 52 and 53 may stop dispensing the mist when there is insufficient liquid in the tank 49, at which point the user may add more liquid into the tank 49 as needed.

Figure 5:
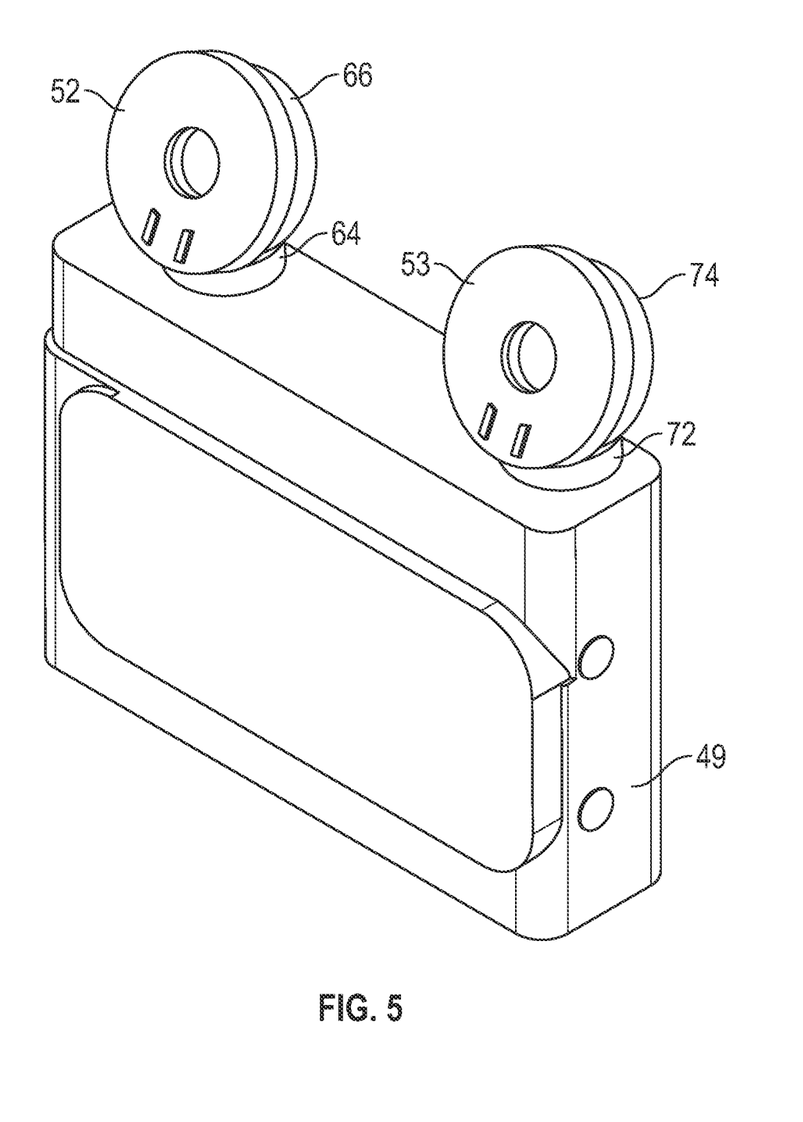
FIG. 5 depicts a perspective front view of the tank with the first and second wicking cylinders at least partially positioned within the tank.

FIG. 5 depicts a perspective front view of the tank with the first and second wicking cylinders at least partially positioned within the tank. The tank 49 may be received in the opening 48 of the body 12 of the air cooler 10 as described herein. The tank 49 may be configured to store a liquid (e.g. water) therein. As shown in FIG. 5, the top end portion (66 or 74, respectively) of each of the first and second wicking cylinders 64 and 72 may be positioned outside the tank 49 and attached to each of the first and second misters 52 and 53, respectively. The bottom end portion (68 or 76, respectively) (see FIG. 3 or 4) and at least part of the middle portion (70 or 78, respectively) (also see FIG. 3 or 4) of each of the first and second wicking cylinders 64 and 72 may be positioned within the tank 49. Each of the first and second wicking cylinders 64 and 72 may be configured to absorb liquid in the tank 49, if there is any, at the bottom end portion (68 or 76, respectively) thereof and to draw up the liquid to the top end portion (66 or 74, respectively) of each of the first and second wicking cylinder 64 and 72. The first and second misters 52 and 53 may then dispense mist using the liquid. The first and second misters 52 and 53 may stop dispensing the mist when there is insufficient liquid in the tank 49, at which point the user may add more liquid into the tank 49 as needed.

Figure 6:
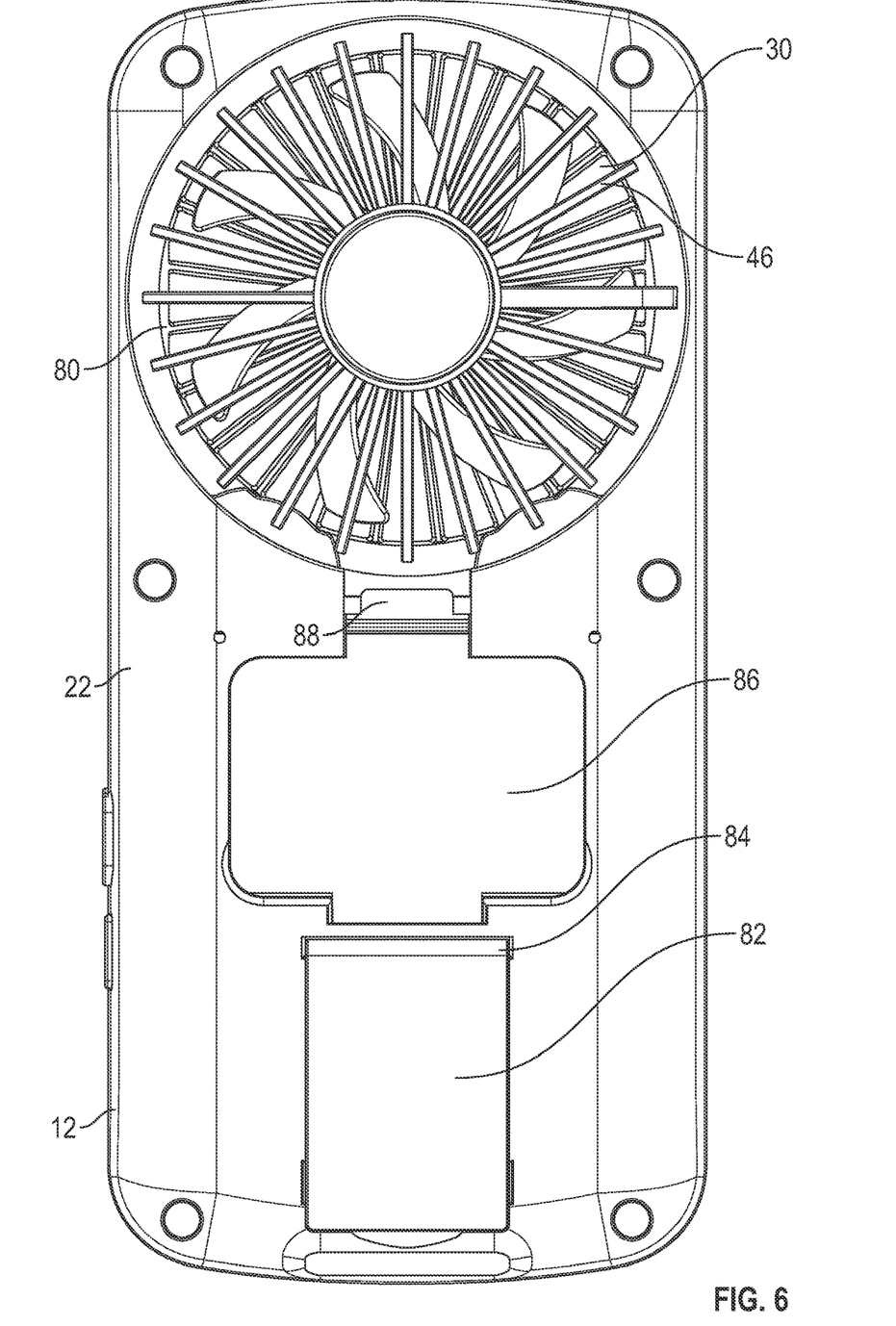
FIG. 6 depicts a rear view of the air cooler of FIG. 1.

FIG. 6 depicts a rear view of the air cooler of FIG. 1. As shown in FIG. 6, the air cooler 10 may include the second fan grill 46 (or the second fan guard) covering the fan 30 and the fan shroud 36 (see FIG. 1 or 2) from the rear face 22 of the body 12 thereof. FIG. 6 shows that the fan shroud 36 includes the rear edge 80. The rear edge 80 may not connect to the second fan grill 46.

The air cooler 10 may include a kickstand 82 disposed on the rear face 22 of the body 12 thereof. The kickstand 82 may be disposed in the bottom portion of the body 12. In some embodiments, the kickstand 82 may be rotatably attached to the rear face 22 of the body 12, for example, along a seam 84. The kickstand 82 may be in a closed position or an open position. FIG. 6 shows that the kickstand 82 is in the closed position. When the kickstand 82 is in the closed position, the kickstand 82 may be part of the rear face 22 of the body 12 such that the kickstand 82 matches the contour of the rear face 22 of the body 12. For example, when the kickstand 82 is in the closed position, the kickstand 82 is integrated with the body 12 and does not protrude from the rear face 22 of the body 12. On the other hand, when the kickstand 82 is in the open position (see FIG. 8), the kickstand 82 may be moved to a position outside the body 12 by rotating away from the rear face 22 of the body 12. When the kickstand 82 is in the open position, the kickstand 82 may support the air cooler 10 on a surface 90 (see FIG. 8). The surface 90 may be a surface of a table, a desk, a floor, or the like.

The air cooler 10 may further include a second cover 86 (e.g. a rear cover) disposed on the rear face 22 of the body 12 thereof. The second cover 86 may be disposed at a location lower than the fan 30. For example, the second cover 86 may be disposed in the middle portion of the body 12. The second cover 86 may be removable. In some embodiments, the second cover 86 may be rotatably coupled to the rear face 22 of the body 12, such as via a hinge or any other desired coupling mechanisms.

The second cover 86 may be in a closed position or an open position. FIG. 6 shows the second cover 86 in the closed position. When the second cover 86 is in the closed position, the second cover 86 covers the opening 48 defined in the body 12 from the rear face 22 of the body 12. When the second cover 86 is in the closed position, the second cover 86 may be part of the rear face 22 of the body 12 such that the second cover 86 matches the contour of the rear face 22 of the body 12. For example, when the second cover 86 is in the closed position, the second cover 86 is integrated with the body 12 and does not protrude from the rear face 22 of the body 12.

The second cover 86 may further include a tab 88 disposed thereon. For example, the tab 88 may be disposed on a top portion of the second cover 86. The user may pull the tab 88 to open the second cover 86 to the open position. When the second cover 86 is in the open position, liquid (e.g. water) may be added into the tank 49 received in the opening 48 of the body 12.

Figure 7:
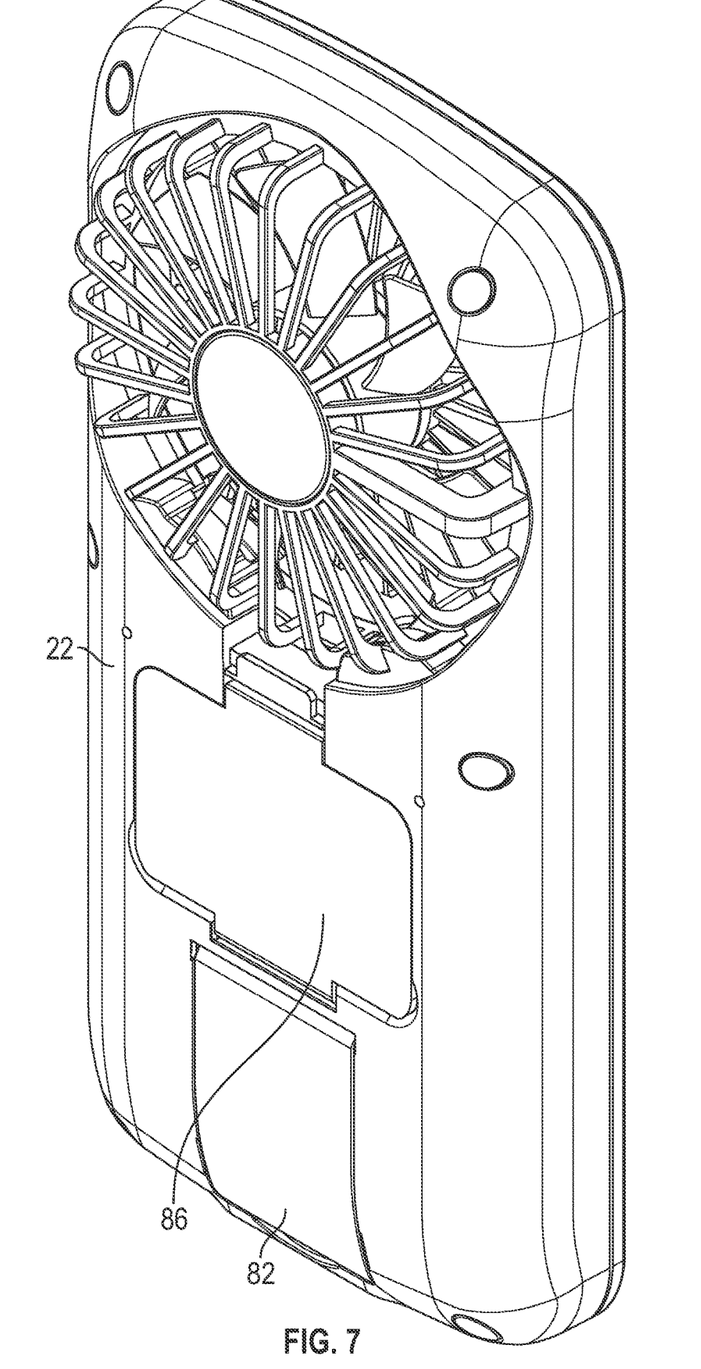
FIG. 7 depicts a perspective rear view of the air cooler of FIG. 1.

FIG. 7 depicts a perspective rear view of the air cooler of FIG. 1. FIG. 7 shows that the second cover 86 is in the closed position. FIG. 7 also shows that the kickstand 82 is in the closed position.

Figure 8:
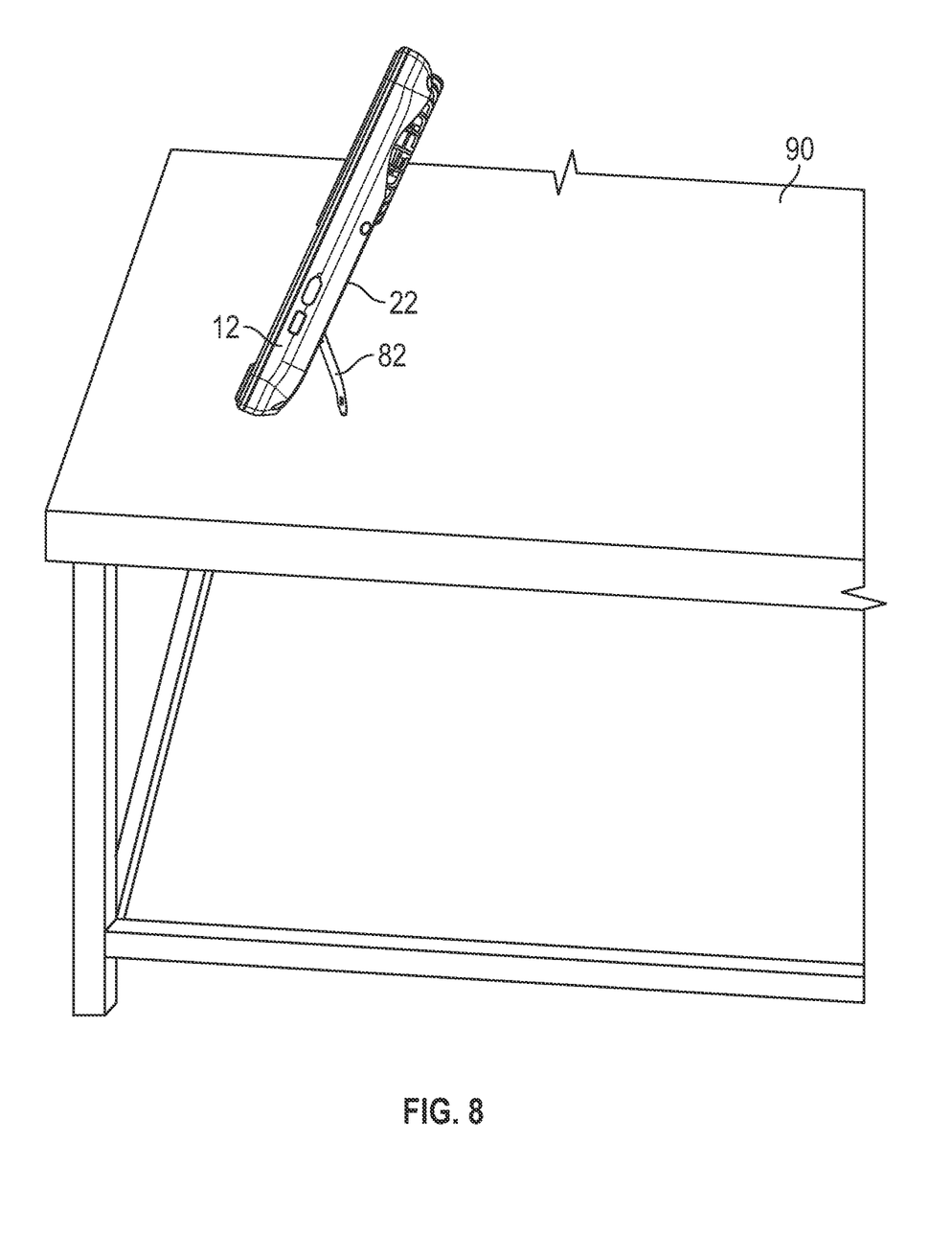
FIG. 8 depicts a perspective side view of the air cooler of FIG. 1 supported on a surface.

FIG. 8 depicts a perspective side view of the air cooler of FIG. 1 supported on a surface. The surface 90 may be a surface of a table, a desk, a floor, or the like. FIG. 8 shows the kickstand 82 in the open position. When the kickstand 82 is in the open position, the kickstand 82 may be moved to a position outside the body 12 of the air cooler 10 by rotating away from the rear face 22 of the body 12 so as to support the air cooler 10 on the surface 90.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An air cooler comprising:
    a body having a top portion, a bottom portion, and a middle portion situated between the top and bottom portions;
    a fan disposed in the top portion of the body, the fan including a fan hub and a plurality of fan blades centrally attached to the fan hub;
    a first mister disposed at a first location within the body, the first location being in front of the plurality of fan blades in the top portion of the body;
    a second mister disposed at a second location within the body, the second location being in front of the plurality of fan blades in the top portion of the body, and the second location being different from the first location;
    a first wicking cylinder positioned substantially parallel to a front face of the air cooler, the first wicking cylinder including a top end portion positioned outside a tank to attach to the first mister and a bottom end portion positioned inside the tank to be brought into contact with liquid to be absorbed; and
    a second wicking cylinder positioned substantially parallel to the front face, the second wicking cylinder including a top end portion positioned outside the tank to attach to the second mister and a bottom end portion positioned inside the tank to be brought into contact with the liquid to be absorbed.

2. The air cooler of claim 1, wherein the first and second locations are symmetrical within the body of the air cooler.

3. The air cooler of claim 1, wherein the first mister is positioned at a first angle directing to the fan, and the second mister positioned at a second angle directing to the fan.

4. The air cooler of claim 3, wherein the first wicking cylinder is at least partially coupled to the first mister and configured to supply the liquid to the first mister for dispensing mist, and the second wicking cylinder is at least partially coupled to the second mister and configured to supply the liquid to the second mister for dispending mist.

5. The air cooler of claim 1, wherein the air cooler further comprises a fan shroud circumferentially surrounding the fan and configured to funnel an air flow from the fan when the air cooler is in operation.

6. The air cooler of claim 1, wherein the air cooler further comprises a first fan grill covering the fan from a front face of the air cooler, and a second fan grill covering the fan from a rear face of the air cooler.

7. The air cooler of claim 1, wherein the middle portion of the body of the air cooler defines an opening, the opening receiving the tank therein, and the tank being configured to store the liquid therein.

8. The air cooler of claim 7, wherein the air cooler further comprises a first cover covering the opening from a front face of the body thereof, and a second cover disposed on a rear face of the body thereof, the second cover being removable.

9. The air cooler of claim 1, wherein the air cooler further comprises a kickstand disposed on a rear surface of the body thereof, the kickstand being in a closed position or an open position.

10. An air cooler comprising:
a body having a top portion, a bottom portion, and a middle portion situated between the top and bottom portions;
a fan disposed in the top portion of the body, the fan including a fan hub and a plurality of fan blades centrally attached to the fan hub;
a first mister disposed at a first location within the body, the first location being in front of the plurality of fan blades in the top portion of the body;
a second mister disposed at a second location within the body, the second location being in front of the plurality of fan blades in the top portion of the body, and the second location being different from the first location;
a first wicking cylinder including a top end portion extending beyond an upper surface of a tank from an inside of the tank, and a bottom end portion positioned inside the tank to be brought into contact with liquid to be absorbed, the first wicking cylinder at least partially coupled to the first mister and configured to supply the liquid to the first mister for dispensing mist; and
a second wicking cylinder including a top end portion extending beyond an upper surface of the tank from an inside of the tank, and a bottom end portion positioned inside the tank to be brought into contact with the liquid to be absorbed, the second wicking cylinder at least partially coupled to the second mister and configured to supply the liquid to the second mister for dispending mist,
wherein each of the first and second wicking cylinders further includes an upper portion of the cylinder extending beyond an upper outer surface of the tank such that the upper portions and the top end portions of the first and second wicking cylinders are exposed outside the tank.

11. The air cooler of claim 10, wherein the first and second locations are symmetrical within the body of the air cooler.

12. The air cooler of claim 10, wherein the first mister is positioned at a first angle directing to the fan, and the second mister positioned at a second angle directing to the fan.

13. The air cooler of claim 10, wherein the air cooler further comprises a fan shroud circumferentially surrounding the fan and configured to funnel an air flow from the fan when the air cooler is in operation.

14. The air cooler of claim 10, wherein the air cooler further comprises a first fan grill covering the fan from a front face of the air cooler, and a second fan grill covering the fan from a rear face of the air cooler.

15. The air cooler of claim 10, wherein the middle portion of the body of the air cooler defines an opening, the opening receiving the tank therein, and the tank being configured to store the liquid therein.

16. The air cooler of claim 15, wherein the air cooler further comprises a first cover covering the opening from a front face of the body thereof, and a second cover disposed on a rear face of the body thereof, the second cover being removable.

17. The air cooler of claim 10, wherein the air cooler further comprises a kickstand disposed on a rear surface of the body thereof, the kickstand being in a closed position or an open position.

18. An air cooler comprising:
a body having a top portion, a bottom portion, and a middle portion situated between the top and bottom portions;
a fan disposed in the top portion of the body, the fan including a fan hub and a plurality of fan blades centrally attached to the fan hub;
a fan shroud circumferentially surrounding the fan and configured to funnel an air flow from the fan when the air cooler is in operation;
a first mister disposed at a first location within the body, the first location being at a first bottom portion of the fan shroud and in front of the plurality of fan blades in the top portion of the body, the first mister being positioned at a first angle directing to the fan;
a second mister disposed at a second location within the body, the second location being at a second bottom portion of the fan shroud and in front of the plurality of fan blades in the top portion of the body, the second location being different from the first location, and the second mister being positioned at a second angle directing to the fan;
a first wicking cylinder positioned substantially parallel to a front face of the air cooler, the first wicking cylinder including a top end portion positioned outside a tank to directly attach to the first mister and a bottom end portion positioned inside the tank to be brought into contact with liquid to be absorbed; and
a second wicking cylinder positioned substantially parallel to the front face, the first wicking cylinder including a top end portion positioned outside the tank to directly attach to the second mister and a bottom end portion positioned inside the tank to be brought into contact with the liquid to be absorbed,
wherein each of the first and second wicking cylinders further includes an upper portion of the cylinder extending beyond an upper outer surface of the tank such that the upper portions and the top end portions of the first and second wicking cylinders are exposed outside the tank.

19. The air cooler of claim 18, wherein the first and second locations are symmetrical within the body of the air cooler.

20. The air cooler of claim 18, wherein the first wicking cylinder is at least partially coupled to the first mister and configured to supply the liquid to the first mister for dispensing mist, and the second wicking cylinder is at least partially coupled to the second mister and configured to supply the liquid to the second mister for dispending mist.

* * * * *